United States Patent
Xu et al.

(10) Patent No.: US 10,372,599 B2
(45) Date of Patent: Aug. 6, 2019

(54) MODEL-BASED MATCHING FOR REMOVING SELECTION BIAS IN QUASI-EXPERIMENTAL TESTING OF MOBILE APPLICATIONS

(71) Applicant: LinkedIn Corporation, Mountain View, CA (US)

(72) Inventors: Ya Xu, Los Altos, CA (US); Nanyu Chen, Sunnyvale, CA (US); Bryan G. Ng, Sunnyvale, CA (US); Weitao Duan, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 373 days.

(21) Appl. No.: 15/140,239

(22) Filed: Apr. 27, 2016

(65) Prior Publication Data
US 2017/0316122 A1 Nov. 2, 2017

(51) Int. Cl.
| G06F 3/00 | (2006.01) |
| G06F 11/36 | (2006.01) |
| G06F 9/50 | (2006.01) |
| G06F 9/54 | (2006.01) |

(52) U.S. Cl.
CPC ............ G06F 11/3692 (2013.01); G06F 9/50 (2013.01); G06F 9/54 (2013.01); G06F 11/368 (2013.01); G06F 11/3672 (2013.01)

(58) Field of Classification Search
CPC .................................. G06F 17/50; G06F 9/54
USPC ............................................. 703/1; 719/310
See application file for complete search history.

(56) References Cited

U.S. PATENT DOCUMENTS

| 6,353,620 | B1 | 3/2002 | Sallberg et al. | |
| 9,015,804 | B2 | 4/2015 | Kalgi et al. | |
| 2011/0137847 | A1 | 6/2011 | Fahner | |
| 2011/0231213 | A1 | 9/2011 | Anderson et al. | |
| 2012/0054154 | A1* | 3/2012 | Tsai ......................... | G06F 8/65 |
| | | | | 707/638 |
| 2012/0239971 | A1 | 9/2012 | Mcmahan et al. | |
| 2013/0254081 | A1* | 9/2013 | Kurabayashi .......... | G06Q 30/04 |
| | | | | 705/34 |

(Continued)

OTHER PUBLICATIONS

Michael, Systems Competition and Network Effects. (Year: 1994).*

(Continued)

*Primary Examiner* — Lechi Truong
(74) *Attorney, Agent, or Firm* — Park, Vaughan, Fleming & Dowler LLP; Chia-Hsin Suen

(57) ABSTRACT

The disclosed embodiments provide a system for evaluating a performance of a mobile application. During operation, the system obtains a first set of data associated with adopters of a new version of a mobile application in a partial rollout of the new version and a second set of data associated with non-adopters of the new version in the partial rollout. Next, the system applies a statistical model to the first and second sets of data to select a subset of the non-adopters as potential adopters of the new version. The system then reduces a bias in a quasi-experimental design associated with the mobile application by using the first set of data and a third set of data associated with the potential adopters to estimate an average treatment effect (ATE) between the new version and an older version of the mobile application.

18 Claims, 8 Drawing Sheets

(56) References Cited

U.S. PATENT DOCUMENTS

| | | |
|---|---|---|
| 2014/0089457 A1* | 3/2014 | Ohrstrom-Sandgren ............... G06F 8/65 709/217 |
| 2014/0180992 A1 | 6/2014 | Lingenfelder et al. |
| 2014/0302837 A1 | 10/2014 | Ronen et al. |
| 2014/0310058 A1 | 10/2014 | Aral et al. |
| 2015/0019639 A1 | 1/2015 | Marlow et al. |
| 2016/0098735 A1 | 4/2016 | Sinha et al. |
| 2016/0188139 A1 | 6/2016 | Pistoia et al. |
| 2016/0188144 A1 | 6/2016 | Pistoia et al. |
| 2016/0253683 A1 | 9/2016 | Gui et al. |
| 2016/0253696 A1 | 9/2016 | Gui et al. |
| 2017/0140417 A1 | 5/2017 | Li et al. |
| 2017/0372247 A1 | 12/2017 | Tauber et al. |
| 2018/0203684 A1* | 7/2018 | Shuvali ............... G06F 8/65 |

OTHER PUBLICATIONS

"Non-Final Office Action Issued in U.S. Appl. No. 15/140,250", dated Jun. 28, 2018, 17 Pages.
"Notice of Allowance Issued in U.S. Appl. No. 15/140,250", dated Jan. 17, 2019, 15 Pages.

* cited by examiner

MODEL-BASED MATCHING FOR REMOVING SELECTION BIAS IN QUASI-EXPERIMENTAL TESTING OF MOBILE APPLICATIONS

RELATED APPLICATION

The subject matter of this application is related to the subject matter in a co-pending non-provisional application by the same inventors as the instant application and filed on the same day as the instant application, entitled "Model Validation and Bias Removal in Quasi-Experimental Testing of Mobile Applications," having Ser. No. 15/140,250, and filing date 27 Apr. 2016.

BACKGROUND

Field

The disclosed embodiments relate to A/B testing. More specifically, the disclosed embodiments relate to techniques for performing model-based matching for removing selection bias in quasi-experimental testing of mobile applications.

Related Art

A/B testing is a standard way to evaluate user engagement or satisfaction with a new service, feature, or product. For example, a social networking service may use an A/B test to show two versions of a web page, email, offer, article, social media post, advertisement, layout, design, and/or other information or content to randomly selected sets of users to determine if one version has a higher conversion rate than the other. If results from the A/B test show that a new treatment version performs better than an old control version by a certain amount, the test results may be considered statistically significant, and the new version may be used in subsequent communications with users already exposed to the treatment version and/or additional users.

On the other hand, conventional A/B testing techniques and methodologies may not be valid or applicable to testing of some mobile application features. In particular, a number of features in a mobile application may not reach end users until the changes are built into a new version of the application, the new version is approved by an "app store" or other digital distribution platform for the mobile application, and the new version is installed from the digital distribution platform onto mobile devices of end users. As a result, the performance of the features may be evaluated in a "quasi-A/B test" that compares the responses of users who adopt the new version of the mobile application from the digital distribution platform with the responses of users who continue to use an older version of the application. If a standard A/B test that assumes randomized selection of the adopters and non-adopters is used to naively compare user behavior between the newer and older versions, results from the A/B test may be thrown off by selection bias between the adopters and non-adopters.

Consequently, effective evaluation of mobile application features may be improved by mechanisms for mitigating and correcting bias during quasi-experimental testing of the features.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
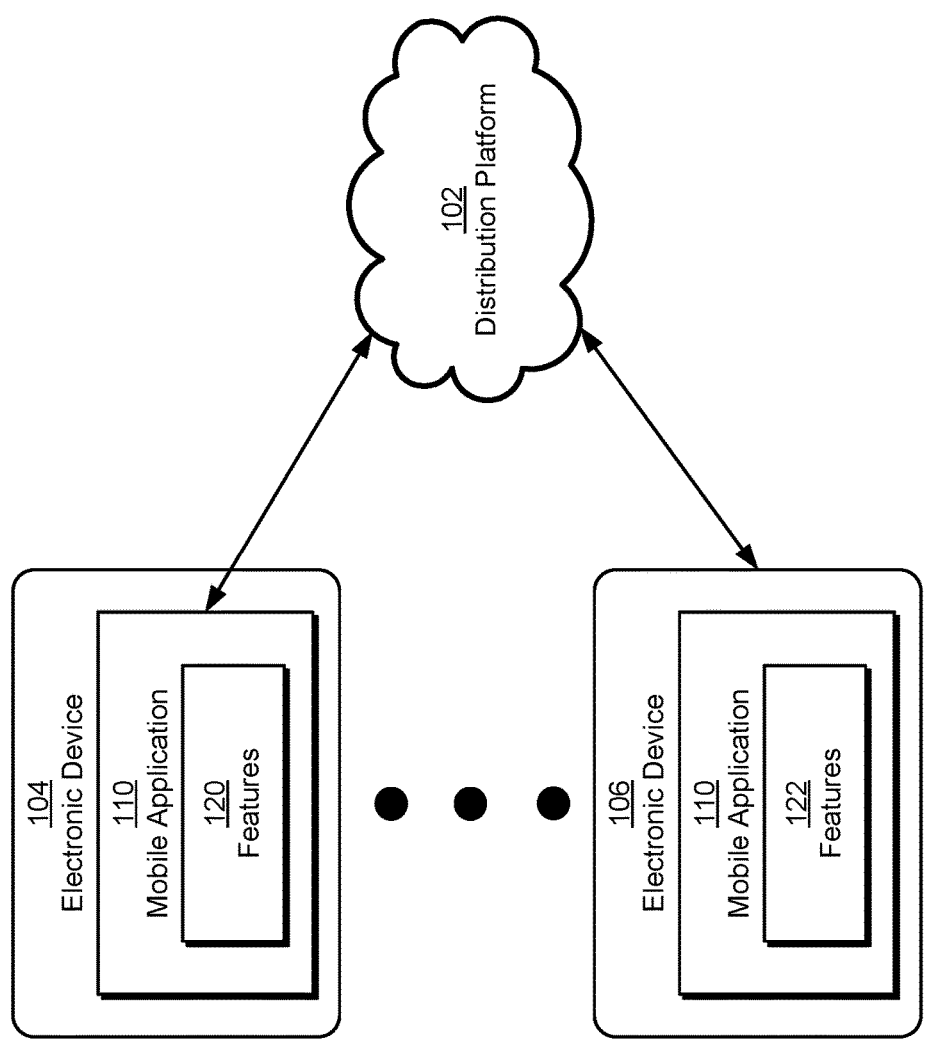
FIG. 1 shows a schematic of a system in accordance with the disclosed embodiments.

The disclosed embodiments provide a method and system for performing causal inference. More specifically, the disclosed embodiments provide a method and system for performing quasi-experimental testing in the context of mobile applications. As shown in FIG. 1, a mobile application 110 may be deployed on multiple electronic devices 104-106. Electronic devices 104-106 may include mobile phones, tablet computers, portable music players, personal digital assistants, navigation systems, smart watches, fitness trackers, digital cameras, and/or other types of network-enabled mobile devices. Mobile application 110 may be downloaded and/or updated from a distribution platform 102 such as an "app store," website, and/or server and installed locally on electronic devices 104-106.

Mobile application 110 may perform a number of tasks for users of electronic devices 104-106. For example, the mobile application may allow the user to send and receive emails or messages, access and/or organize digital media, create and edit documents, play a game, access a social network or online professional network, interact with other electronic devices or computer systems, use mapping and/or navigation services, track activity or location, manage finances, and/or play games.

In addition, different versions of mobile application 110 may provide different sets of features 120-122 to the users. For example, installation of the latest version of the mobile application on electronic device 104 may allow the user of electronic device 104 to access newly released user-interface elements, functionality, and/or other features 120 in the latest version. On the other hand, an older version of the mobile application may be installed on electronic device 106, resulting in a different user experience when the user of electronic device 106 interacts with a different set of features 122 in the older version.

Changes to some or all features 120-122 in mobile application 110 may be propagated to electronic devices 104-106 in a multi-step process that involves coding the changes into new versions (e.g., builds) of the mobile application, obtaining approval of the new versions from distribution platform 102, and downloading and installing the new versions on the electronic devices. As a result, the feature release cycle in the mobile application may differ significantly from that of a website or web application, in which features can dynamically be selected and pushed by servers on which the website or web application is hosted.

In turn, A/B testing and/or other statistical inference of different sets of features 120-122 in mobile application 110 may be affected by the longer release cycles of the mobile application and resulting selection bias in users of electronic devices 104-106. More specifically, the performance of different features (e.g., features 120 and 122) in mobile application 110 may be compared by comparing the responses of users who adopt a new version of the mobile application containing one set of features with the responses of users who continue to use an older version of the application containing another set of features. Because the two sets of users are observed instead of randomly assigned, such comparison may be performed using a quasi-experimental design.

However, quasi-experimental evaluation of mobile application 110 may be affected by selection bias between early and late adopters of new versions of the mobile application, which may lead to incorrect conclusions about the users' responses to the new versions. For example, "premium" members of an online professional network may be more likely to adopt new versions of a mobile application for accessing the online professional network, and be more engaged with the mobile application, than regular members of the online professional network. As a result, the new version may be determined to have a significantly positive effect on user engagement, even when the actual effect is neutral or negative.

Figure 2:
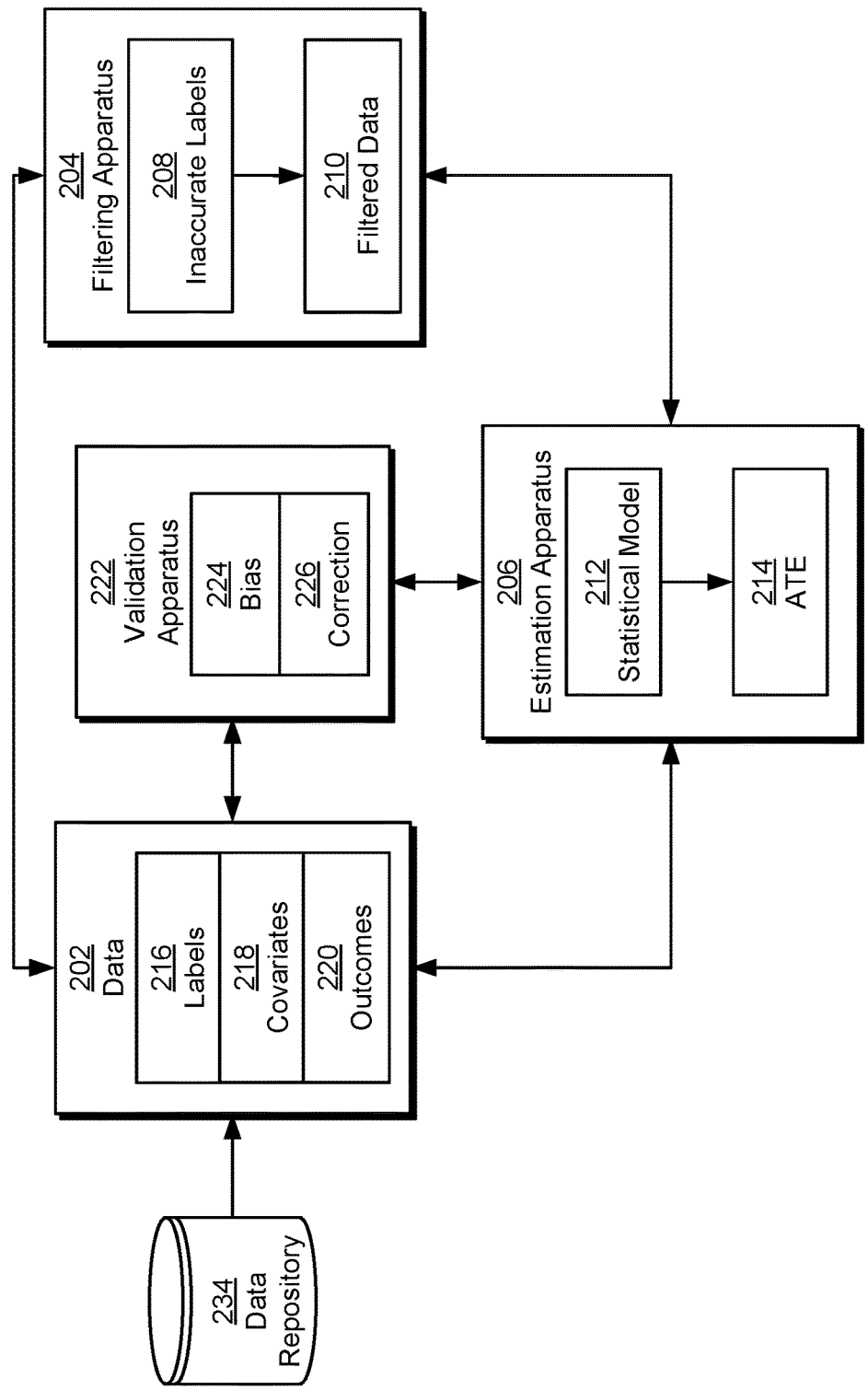
FIG. 2 shows a system for evaluating a performance of a mobile application in accordance with the disclosed embodiments.

In one or more embodiments, causal inference of user behavior with different features in mobile application 110 is improved by validating causal relationships and correcting for selection bias in quasi-experimental designs used in testing of the features. As shown in FIG. 2, an estimation apparatus 206 may use a statistical model 212 to estimate an average treatment effect (ATE) of different versions of a mobile application, such as mobile application 110 of FIG. 1. For example, statistical model 212 may include an ordinary least squares (OLS) model, endogenous switching model, propensity score model, iteratively doubly robust model, Heckman selection model, and/or other type of model for performing statistical or causal inference.

More specifically, statistical model 212 may be used to evaluate and/or predict outcomes 220 such as views, clicks, messages, visits, and/or other metrics associated with use of the mobile application. Within the statistical model, outcomes 220 may be related to one or more labels 216 and/or a number of covariates 218.

Labels 216 may include "assignments" of users of the mobile application to different values of a treatment variable. For example, a quasi-experiment of the mobile application may include one or more labels, each with two possible values. One value may represent a treatment version (e.g., a newer version) of the mobile application or a feature in the mobile application, and another value may represent a control version (e.g., an older version or a lack of the treatment version) associated with the mobile application or feature.

Covariates 218 may include features of the users that potentially affect outcomes 220. For example, covariates 218 for outcomes associated with use of the mobile application may include an operating system version associated with the electronic device on which the mobile application is installed, a location (e.g., country, region, etc.), a language used to interact with the mobile application, and/or a user type (e.g., premium user, regular user, etc.) of a user of the mobile application. The covariates may also include usage-related parameters, such as a usage frequency for the mobile application (e.g., a number of days in the past number of weeks, a number of visits in the previous day, etc.), a probability of adopting a new version of the mobile application by a certain day after the release of the new version, and/or a set of historic page views over a pre-specified period (e.g., the last two weeks).

Covariates 218 may additionally include features that are specific to the functionality of the mobile application. For example, if the mobile application is used to access a social network such as an online professional network, the covariates may include a user's industry, profile completeness, level of job-seeking activity, number of profile views, and/or number of connections in the social network.

To generate ATE 214, one or more sets of data 202 containing labels 216, covariates 218, and outcomes 220 may be obtained from a data repository 234 such as a database, data warehouse, cloud storage, and/or other data-storage mechanism. The data may be applied to statistical model 212, and the ATE may be obtained as a predicted outcome of the statistical model. For example, the statistical model may have the following linear representation:

$$Y = \beta_0 + Z\beta_1 + X\beta_2 + \in$$

In the above equation, $Y=(Y_1, \ldots, Y_n)^T$ may be an outcome vector that contains outcomes 220 $Y_i$ for users i=1, ..., n. $Z=(Z_1, \ldots, Z_n)^T$ may contain labels 216 for the users, where $Z_i \in \{0, 1\}$, $Z_i=1$ when a user is in treatment (e.g., the user has adopted a new version of the mobile application), and $Z_i=0$ otherwise. Each user may have two potential outcomes 220 represented by the following:

$$Y_i = \begin{cases} Y_{i1} & \text{if } Z_i = 1 \\ Y_{i0} & \text{if } Z_i = 0 \end{cases}$$

ATE 214 may be defined as the difference of the average values of the outcomes between applying the treatment to the entire user population and applying the control to the entire user population:

$$\Delta_{ATE} = \frac{1}{n}\sum_1^n Y_{i1} - \frac{1}{n}\sum_1^n Y_{i0}$$

While ATE 214 cannot be directly measured because only one outcome can be observed per user, ATE 214 can be estimated by the following:

$$\hat{\Delta}_{ATE} = \frac{1}{n_1}\sum_{\{i:Z_i=1\}} Y_{i1} - \frac{1}{n_0}\sum_{\{i:Z_i=0\}} Y_{i0} = \overline{Y}^1 - \overline{Y}^0$$

Continuing with the exemplary linear representation of the statistical model, $X=(X_1, \ldots, X_n)^T$ may be a matrix representing all covariates 218 that correlate with both Z and Y. Observed values of X, Y, and Z from data repository 234 may then be used to estimate the values of coefficients $\beta_0$, $\beta_1$, and $\beta_2$, with $\beta_1$ representing ATE 214.

As mentioned above, statistical model 212 may include bias 224 from intrinsic differences between adopters of new versions of the mobile application and non-adopters of the new versions. For example, users who adopt the new versions soon after the new versions are released may generally be more engaged with the mobile application than users who adopt more slowly. Differences in the level of engagement between adopters and non-adopters may also accumulate over time, resulting in an increase in the selection bias when the adopters and non-adopters are compared over a longer time interval (e.g., a week instead of a day). Conversely, the increase in bias may be mitigated by comparing the adopters and non-adopters over a smaller time interval and/or controlling for the number of days within the time interval in which the users are active (e.g., by including historic usage frequencies of the mobile application in covariates 218).

Data 202 in data repository 234 may further indicate that adoption patterns for users of the mobile application may tend to be consistent across releases, such that a previous early adopter is significantly more likely to quickly adopt a new version of the mobile application than a previous late adopter or non-adopter. For example, early adopters may typically have automatic updating of the mobile application enabled, while late adopters or non-adopters may select a manual update option for the mobile application.

Conversely, historic adoption patterns associated with the mobile application may be less applicable immediately after a new version of the mobile application is released. For example, a number of users may set the mobile application to automatically update when the electronic device is connected to a WiFi network. Because WiFi may or may not be available immediately after the release, adoption of the new version may be relatively inconsistent with historic data for a short period (e.g., 1-2 days) after the release.

To improve the accuracy of ATE 214, a validation apparatus 222 may use data 202 from data repository 234 to assess bias 224, and the validation apparatus 222 and/or estimation apparatus 206 may apply a correction 226 of the bias to the statistical model and/or ATE. As described in further detail below with respect to FIG. 3, the validation apparatus may use one set of data collected from two or more substantially identical versions of the mobile application to identify the bias as a nonzero difference in potential outcomes from the identical versions. The validation and/or estimation apparatus may then remove the bias from an estimate of ATE 214, which is generated from a different set of data that is collected from two or more non-identical versions of the mobile application. Such removal of the bias from the estimated ATE may allow the estimate to better reflect the true ATE between the non-identical versions.

To further improve the performance of statistical model 212, a filtering apparatus 204 may identify potentially inaccurate labels 208 from data 202 used to estimate ATE 214. For example, filtering apparatus 204 may use historic data from data repository 234 to identify the potentially inaccurate labels as labels 216 associated with users who are likely to adopt a new version of the mobile application but are currently non-adopters, due to initial randomness in adoption patterns for the mobile application after the new version is released. The filtering apparatus 204 may then remove the inaccurately labeled data to produce filtered data 210 that better estimates the parameters of statistical model 212 and/or ATE 214.

When adopters of the new version can be compared to non-adopters in a partial rollout of the mobile application, validation apparatus 222 and/or estimation apparatus 206 may configure statistical model 212 to select users for comparison in a way that reduces bias 224. For example, a distribution platform of the mobile application may allow the new version to be randomly released to a subset (e.g., 20%) of users instead of all users. As a result, the statistical model may be used to compare adopters of the new version to non-adopters who would adopt the new version if the new version were released to them. By restricting the comparison of data 202 to similar users, selection bias may be removed from statistical model 212 and/or ATE 214, as discussed in further detail below with respect to FIG. 4. Such removal of selection bias may additionally be adjusted or validated by validation apparatus 222 using historic data collected from substantially similar versions of the mobile application.

Figure 3:
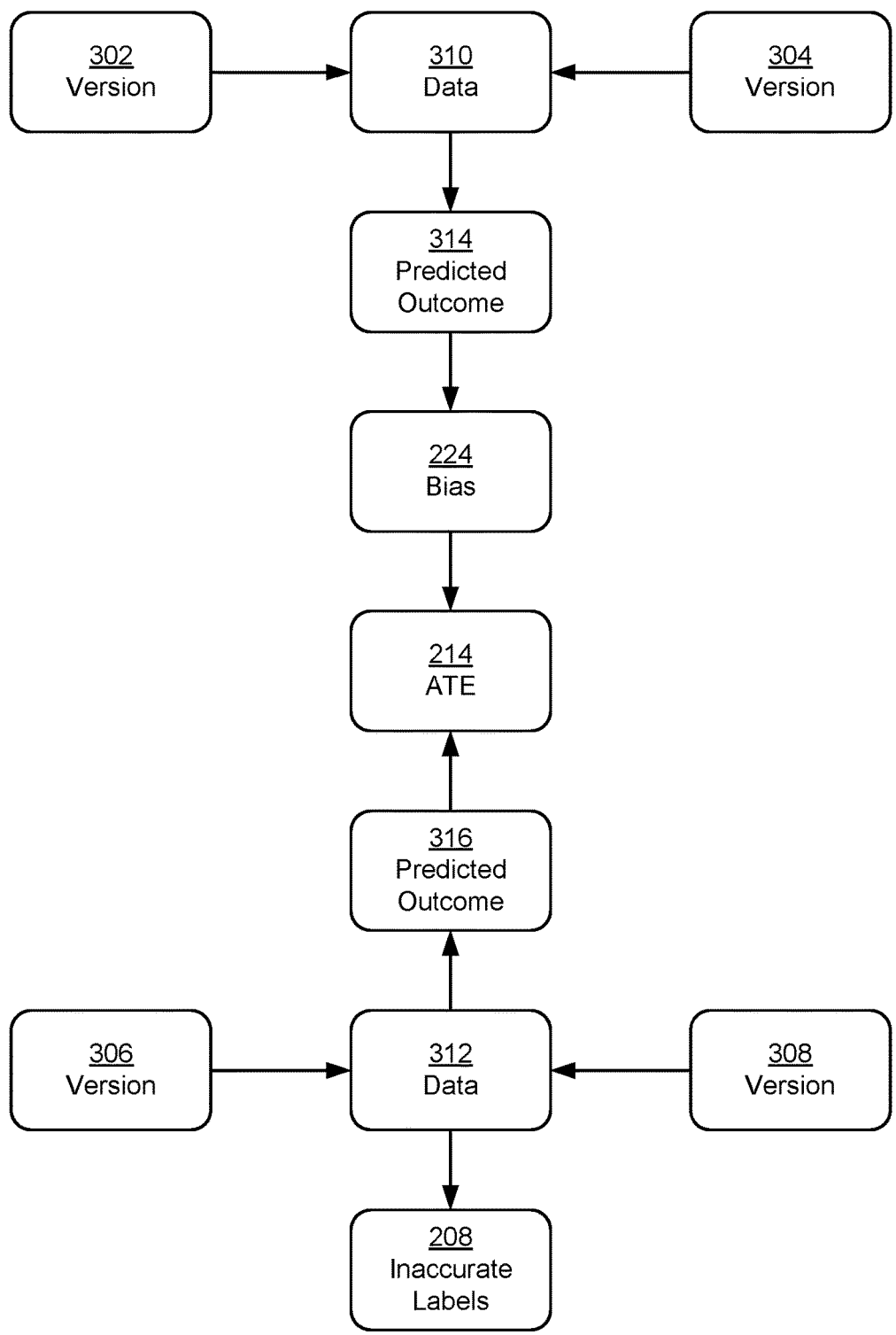
FIG. 3 shows the identification and removal of bias in a quasi-experimental design in accordance with the disclosed embodiments.

FIG. 3 shows the identification and removal of bias 224 in a quasi-experimental design in accordance with the disclosed embodiments. As described above, the bias may include selection bias associated with differences in behavior between adopters and non-adopters of a new version of a mobile application. The bias may additionally be reflected in the calculation of ATE 214 from data collected from the adopters and non-adopters, which may result in incorrect conclusions about the effect of the new version on the users' behavior.

To mitigate the effect of bias 224 on ATE 214, data 310 collected from two substantially identical versions 302-304 of the mobile application may be used to generate a predicted outcome 314 of a statistical model, such as statistical model 212 of FIG. 2. For example, data 310 may be collected during a minor release that contains bug fixes and/or other changes that do not affect the features or functionality of the mobile application. Because the collected data should have a true ATE 214 of close to 0, predicted outcome 314 may effectively represent the outcome of an A/A test using the statistical model.

Consequently, a value of predicted outcome 314 that results in a non-zero estimate of ATE 214 may correspond to bias 224 in the statistical model. In the previous exemplary linear representation of the statistical model, the ATE may be obtained from the coefficient $\beta_1$. When a nonzero value for the coefficient is produced from data 310 that has a real ATE of close to 0, the coefficient may be an estimate of the statistical model's bias. The consistent presence of bias 224 in the statistical model may be validated by estimating ATE 214 across multiple sets of substantially identical versions of the mobile application.

A different predicted outcome 316 of the statistical model may be generated using data 312 that is collected from two non-identical versions 306-308 of the mobile application. For example, predicted outcome 316 may be used in a "quasi-A/B test" to estimate the effect (e.g., ATE 214) of a newer version of the mobile application on the behavior (e.g., clicks, views, visits, messages, connections, etc.) of the users. In the quasi-A/B test, data 312 may be collected during an evaluation period after the newer version is released, and predicted outcome 316 may be generated based on the collected data and labels of the users as adopters or non-adopters of the newer version.

However, a portion of data 312 may be associated with inaccurate labels 208 that adversely affect the accuracy of the statistical model. For example, users who are likely to adopt the newer version may initially be labeled as non-adopters due to settings associated with automatic updating of the mobile application on the users' electronic devices. Because the users may have very similar covariates to adopters of the newer version, data from the users may interfere with the accurate estimation of predicted outcome 316 by the statistical model.

To mitigate the effect of noisy data from "random" non-adopters and/or other types of inaccurately labeled users on the statistical model, the noisy data may be identified and removed from data 312 before data 312 is used to generate predicted outcome 316. For example, historic adoption patterns from data 310 and/or other data sets may be used to identify and remove likely adopters from the current set of non-adopters in data 312. The statistical model may then be applied to the remaining filtered data to produce predicted outcome 316 from less noisy and/or more accurately labeled data.

The estimated bias 224 from predicted outcome 314 may then be used to normalize predicted outcome 316 and improve the accuracy of the estimated ATE 214 associated with predicted outcome 316. For example, predicted outcome 316 may be used to estimate a first value of the ATE for non-identical versions 306-308 of the mobile application. To correct for selection bias in the statistical model, a second value of the ATE that is generated from substantially identical versions 304-306 of the mobile application may be subtracted from the first value, thus removing the bias from the first value.

Figure 4:
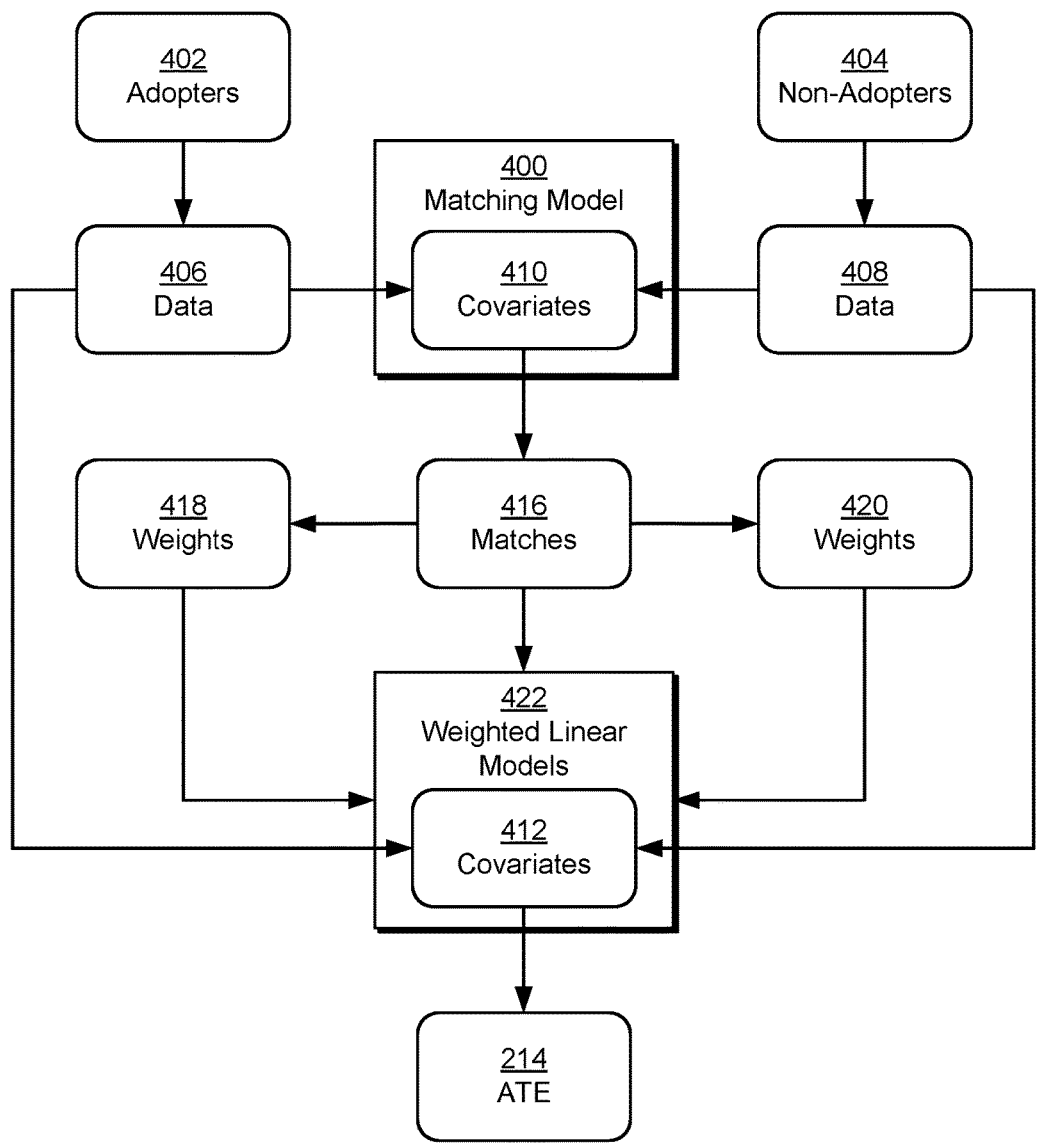
FIG. 4 shows the use of model-based matching to remove selection bias in a quasi-experimental design in accordance with the disclosed embodiments.

FIG. 4 shows the use of model-based matching to remove selection bias in a quasi-experimental design in accordance with the disclosed embodiments. As described above, such model-based matching may be used with a partial rollout of a mobile application, which involves the release of a new version of the mobile application to a random subset of users.

In the partial rollout, adoption of the new version may be influenced by two separate factors: the eligibility of the users to adopt the new version and the propensity of the users toward adopting the new version. Observed adopters 402 of the new version may include users who are both eligible and inclined to adopt the new version. Non-adopters 404 of the mobile application may include three separate groups of users: those who are eligible to adopt but are disinclined to adopt, those who are ineligible to adopt but inclined to adopt, and those who are both ineligible and disinclined to adopt the new version. Because the adopters are intrinsically different from the non-adopters, a naïve comparison of the adopters and non-adopters may suffer from the same selection bias as the selection bias encountered during a release of the new version to all users.

To reduce bias in estimating ATE 214 between the new version and an older version of the mobile application, a statistical model may be applied to data 406 associated with adopters 402 of the new version and data 408 associated with non-adopters 402 of the new version to select a subset of the non-adopters as potential adopters of the new version. The potential adopters may represent users who would adopt the new version if the users were included in the rollout. Because the potential adopters are similar to the adopters, comparisons of the adopters and potential adopters may be more precise than comparisons of the adopters and non-adopters.

In one or more embodiments, a matching model 400 is used to identify potential adopters from a larger set of non-adopters 404. As shown in FIG. 4, the matching model may use a set of covariates 410 in data 406-408 to generate matches 416 among adopters 402 and the potential adopters. For example, the matching model may perform exact matching of a limited number of covariates 410 between adopters 402 and non-adopters 404. As a result, output of the matching model may include a set of matches, with each match specifying a subset of adopters and non-adopters with the exact same values for covariates 410.

To identify covariates 410 for inclusion in matching model 400, a candidate set of covariates from data 406-408 may be selected to span a range of user attributes and/or engagement characteristics. The candidate set may also be selected to include features that cannot be affected by treatment, such as variables that were collected before the release of the new version and/or stable user attributes such as country or language. Observations that do not overlap in empirical distribution may additionally be removed from the candidate set. A final reduction of the candidate set to a limited subset (e.g., 10) of covariates 410 may be performed by dropping individual variables from the candidate set and performing validation using A/A test results, with the goal of producing as many matched samples as possible without increasing bias.

To further improve matching of adopters 402 with the potential adopters, continuous variables and/or variables with large numbers of possible values in covariates 410 may be "bucketized" into discrete ranges and/or a smaller set of possible values. Such bucketizing may also be performed in a way that evenly distributes the observations among the buckets. The number of covariates used in matching model 410 may additionally be adjusted based on the number of adopters 402. For example, the matching model may have a much smaller number of covariates in the first day after rollout of the new version than in subsequent days after the rollout, when more users have adopted the new version.

After matches 416 are generated using the selected covariates 410, the matches may be filtered to remove matches with unusual numbers of users. For example, a 20% rollout of the new version may produce an expected match of four non-adopters to each adopter. As a result, statistically anomalous matches that contain hundreds of thousands of non-adopters per adopter may be discarded.

A set of weights 418-420 may be calculated from the matches. The weights may ensure that the total effect of data 406 from adopters 402 is the same as the total effect of data 408 from non-adopters 404, even when the numbers of adopters and non-adopters differ. For example, matches 416 may include an exact match in the covariates of two adopters and three non-adopters. To balance the contributions of the adopters and non-adopters toward estimating ATE 214, weights for the adopters may be set to 1, and weights for the non-adopters may be set to ⅔.

Matches 416, weights 418-420, and a full set of covariates 412 from subsets of data 406-408 associated with the matched users may be used to produce one or more weighted linear models 422. For example, the linear representation of a statistical model for estimating the ATE may be generalized into an endogenous switching model with the following form:

$$Y_1 = X_1\beta_1 + \epsilon_1 \text{ if } Z=1$$

$$Y_0 = X_0\beta_0 + \epsilon_0 \text{ if } Z=0$$

The first equation may be fitted using data from the matched adopters 402, and the second equation may be fitted using data from the matched non-adopters 404 (e.g., potential adopters). As a result, the endogenous switching model may account for interactions between the treatment variable and the covariates.

The weighted linear models may then be used to estimate ATE 214. Continuing with the previous example, the endogenous switching model may be used to produce estimates of the response under the new version and the old version, or $\hat{y}_i^{(1)}$ and $\hat{y}_i^{(0)}$, respectively. The estimates may be included in a doubly robust estimator (DRE) for the ATE with the following form:

$$DRE = \frac{1}{\left(\sum_{i=1}^{n} w_i\right)} \left( \sum_{i=1}^{m} w_i\left(y_i - \hat{y}_i^{(0)}\right) + \sum_{i=m+1}^{n} w_i\left(\hat{y}_i^{(1)} - y_i\right) \right)$$

In the above equation, $w_i$ is a weight from matching model 400, and $y_i$ is the observed value of the corresponding user. An A/A test of the weighted linear models may be used to validate the removal of bias and/or reduce any remaining bias from the estimated ATE, as described above.

Those skilled in the art will appreciate that other techniques may be used to select potential adopters for comparison to adopters 402. For example, other matching techniques, such as nearest neighbor matching and/or propensity score matching, may be used in lieu of or in addition to the exact matching performed by matching model 400. In another example, a geometric distribution model and historic data may be used to estimate the adoption probabilities of both the adopters and non-adopters, and users with high propensity to adopt (e.g., estimated adoption probabilities that exceed a threshold) in both groups may be selected for comparison.

The quasi-experimental design of FIG. 4 may additionally be used to evaluate novelty effect associated with increased use of the new version immediately after the new version is released, which may be confounded by adoption bias in users of the mobile application. For example, a retrospective study may use data 406-408 to construct a cohort of adopters 402 and another cohort of non-adopters 404, with users who eventually adopt the new version during the evaluation period of the quasi-experimental design omitted from the non-adopter cohort. Next, the cohorts may be matched using exact matching from matching model 400 to produce two matched cohorts with weights 418-420. Bias may then be removed from the matched cohorts using weighted linear models 422, and the novelty effect may be assessed by tracking a change in the estimated ATE 214 between the same cohorts over the course of the evaluation period.

Figure 5:
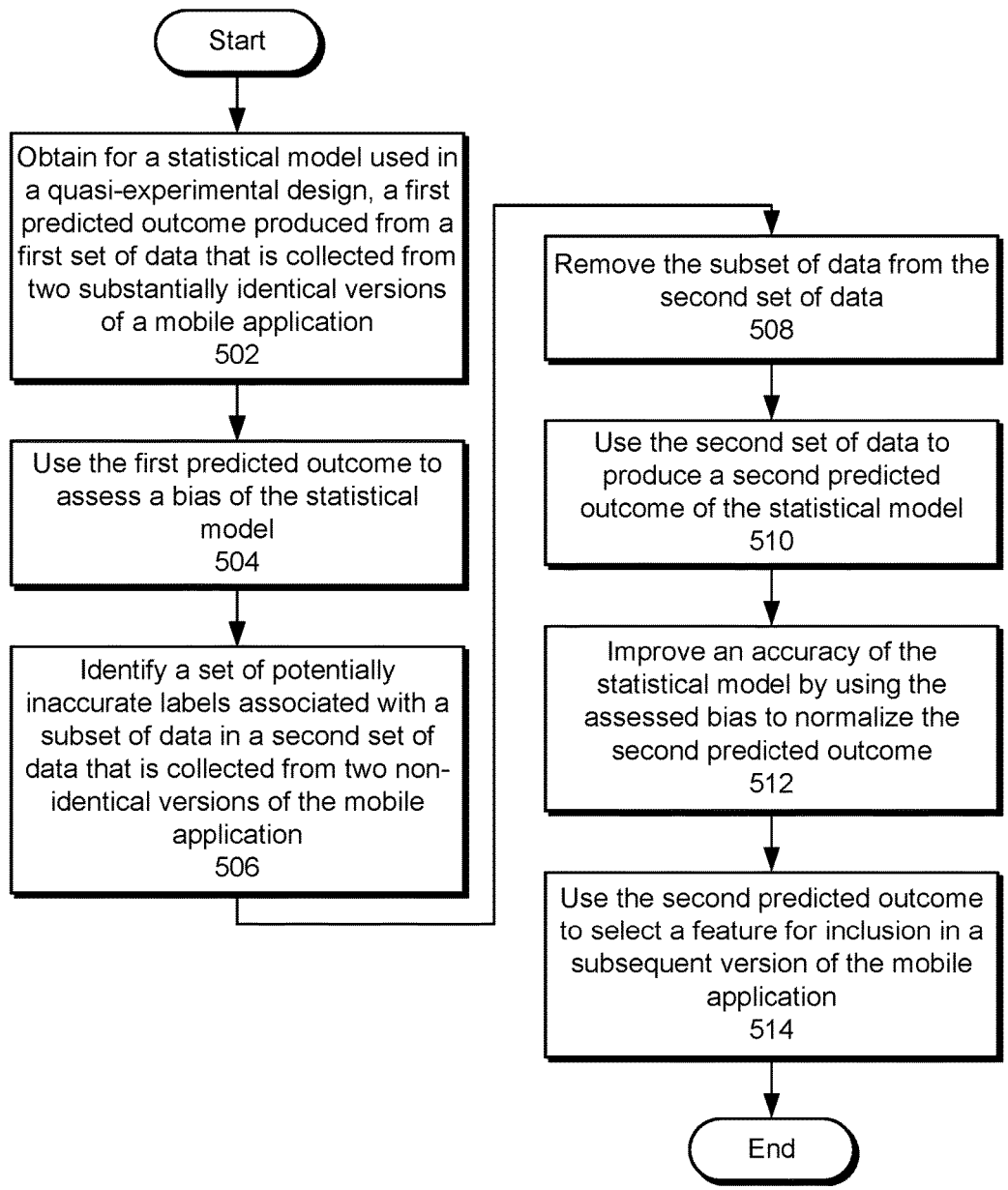
FIG. 5 shows a flowchart illustrating the process of performing quasi-experimental testing of a mobile application in accordance with the disclosed embodiments.

FIG. 5 shows a flowchart illustrating the process of performing quasi-experimental testing of a mobile application in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, a first predicted outcome produced from a first set of data that is collected from two substantially identical versions of a mobile application is obtained for a statistical model used in a quasi-experimental design (operation 502). For example, the first predicted outcome may be generated using data that was collected during a minor release of the mobile application. Next, the first predicted outcome is used to assess a bias of the statistical model (operation 504). For example, the bias may be identified and/or obtained from an ATE associated with the first predicted outcome.

A set of potentially inaccurate labels associated with a subset of data in a second set of data that is collected from two non-identical versions of the mobile application is also identified (operation 506), and the subset of data is removed from the second set of data (operation 508). The potentially inaccurate labels may be applied to a treatment variable in the statistical model, such as the adoption or non-adoption of a newer version of the mobile application after the newer version is released. Historic adoption patterns may be used to identify and remove data associated with likely adopters of the newer version from the second set of data.

The second set of data is then used to produce a second predicted outcome of the statistical model (operation 510). For example, the second set of data may be used to adjust parameters of the statistical model, and the second predicted outcome may be obtained using one or more of the parameters. After the second predicted outcome is obtained, the accuracy of the statistical model is improved by using the assessed bias to normalize the second predicted outcome (operation 512). For example, a first ATE estimated from the first predicted outcome may be subtracted from a second ATE estimated from the second predicted outcome to remove the bias from the second ATE.

Finally, the second predicted outcome is used to select a feature for inclusion in a subsequent version of the mobile application (operation 514). For example, the normalized value of the second predicted outcome may be used to identify, for inclusion in subsequent versions of the mobile application, features that significantly increase user engagement (e.g., clicks, visits, views, etc.) with the mobile application.

Figure 6:
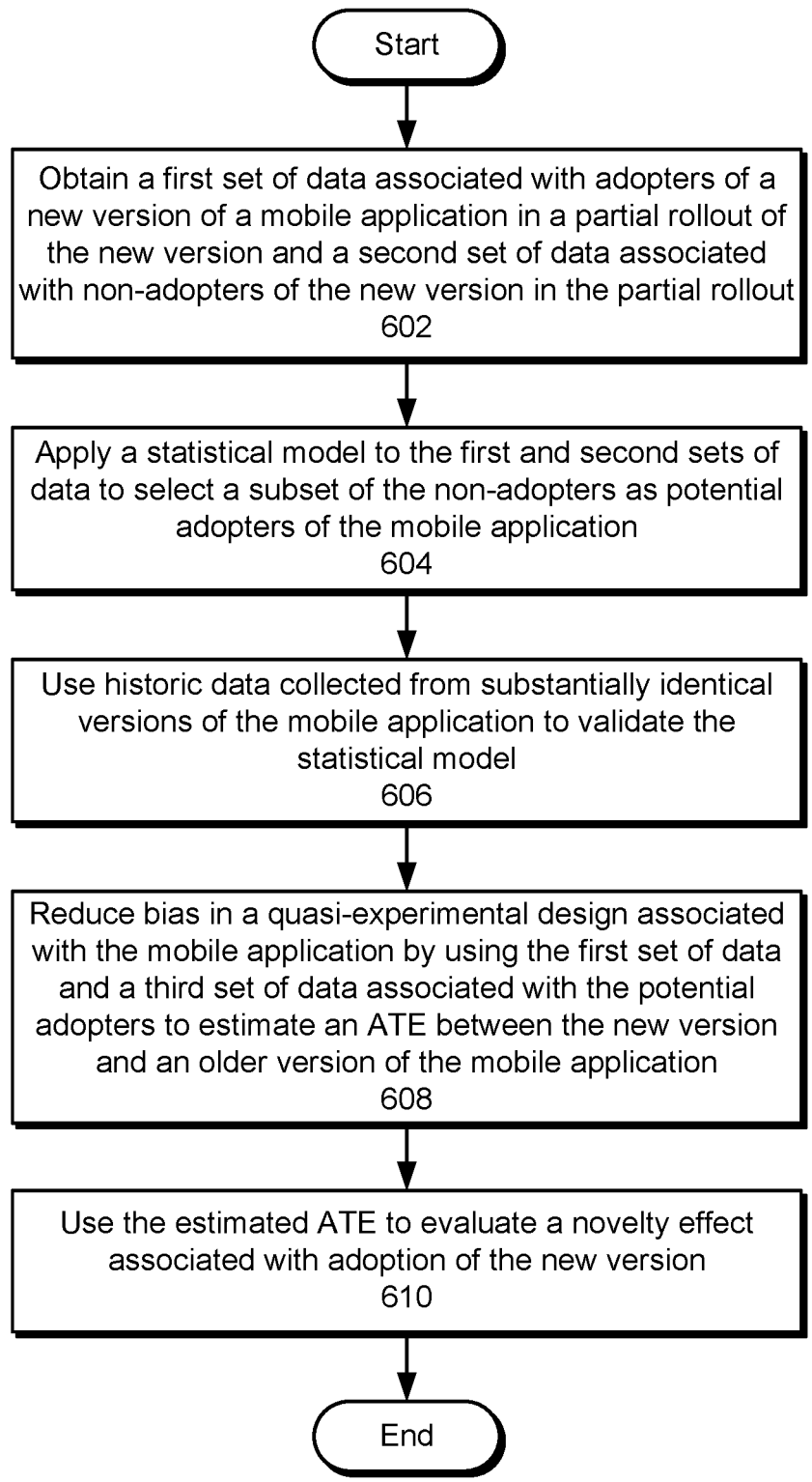
FIG. 6 shows a flowchart illustrating the process of performing quasi-experimental testing of a mobile application in accordance with the disclosed embodiments.

FIG. 6 shows a flowchart illustrating the process of performing quasi-experimental testing of a mobile application in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, a first set of data associated with adopters of a new version of a mobile application in a partial rollout of the new version and a second set of data associated with non-adopters of the application in the partial rollout are obtained (operation 602). The partial rollout may allow the users to be divided into the adopters, non-adopters who are eligible to adopt the new version, non-adopters who are ineligible and inclined to adopt the new version, and non-adopters who are neither eligible nor inclined to adopt the new version.

Next, a statistical model is applied to the first and second sets of data to select a subset of the non-adopters as potential adopters of the mobile application (operation 604). For example, a matching technique may be used to match a subset of the adopters to the potential adopters, as described in further detail below with respect to FIG. 7. Historic data collected from substantially identical versions of the mobile version may also be used to validate the statistical model (operation 606), as discussed above.

Bias in a quasi-experimental design associated with the mobile application is then reduced by using the first set of data and a third set of data associated with the potential adopters to estimate an ATE between the new version and an older version of the mobile application (operation 608), as described in further detail below with respect to FIG. 7. Finally, the estimated ATE is used to evaluate a novelty effect associated with adoption of the new version (operation 610). For example, the ATE may be estimated from matched cohorts of the adopters and non-adopters over an evaluation period of the quasi-experimental design. The change in the estimated ATE over the evaluation period may then be tracked, and novelty effect may be found in an initially high value of the ATE that settles into a smaller, consistent value over the remainder of the evaluation period.

Figure 7:
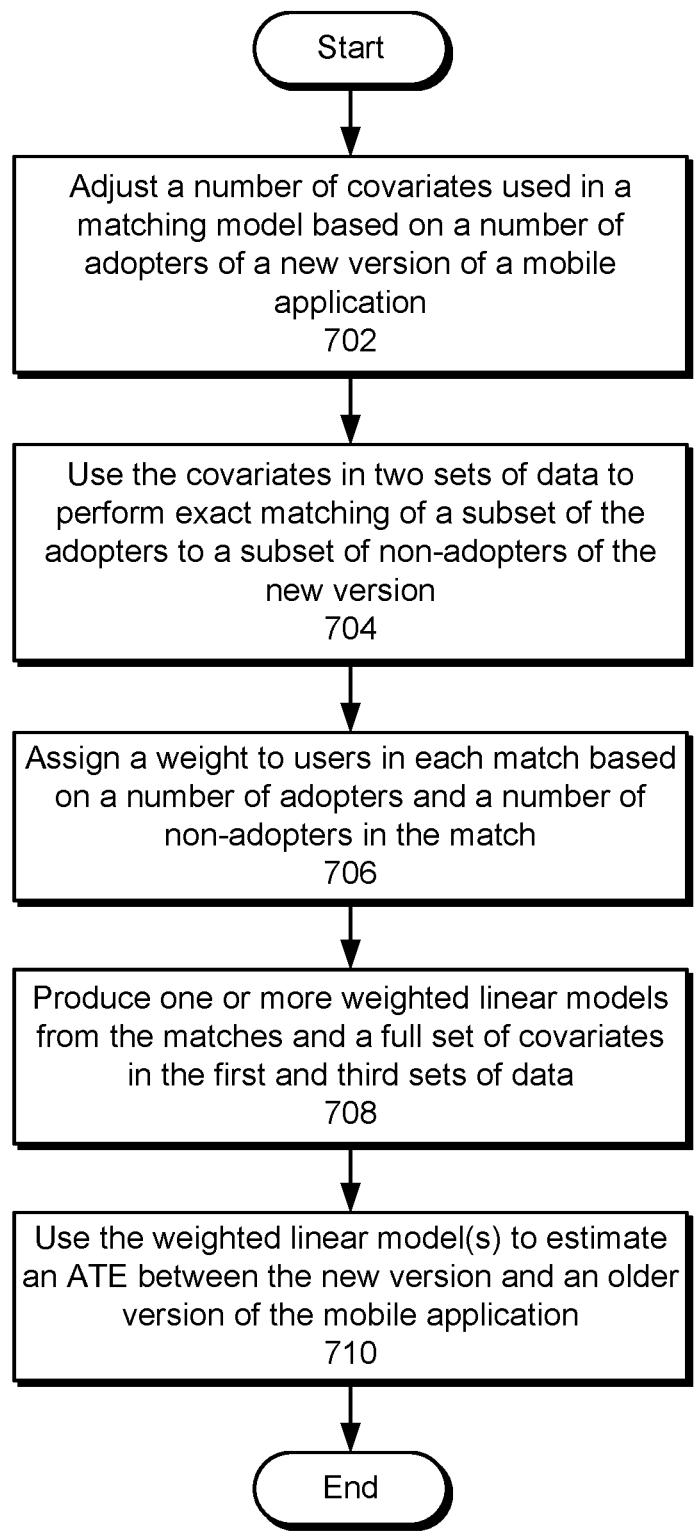
FIG. 7 shows a flowchart illustrating the process of reducing bias in a quasi-experimental design associated with a mobile application in accordance with the disclosed embodiments.

FIG. 7 shows a flowchart illustrating the process of reducing bias in a quasi-experimental design associated with a mobile application in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

First, a number of covariates used in a matching model is selected based on the number of adopters of a new version of a mobile application (operation 702). For example, the number of covariates may be selected to be proportional to the number of adopters of the new version. As a result, the number of covariates may initially be small to reflect a relatively small set of early adopters of the new version. As additional users adopt the new version (e.g., due to settings associated with automatic updating to the new version and/or manual updating of the application by the users), the number of covariates may be increased to improve the performance of the matching model.

Next, the selected covariates in two sets of data are used to perform exact matching of a subset of adopters to a subset of non-adopters for the new version (operation 704). For example, the matching model may generate a set of matches, with each match containing one or more adopters and one or more non-adopters with identical covariates. To increase the number of possible matches, continuous variables and/or variables with a large number of possible values may be converted into bucketized variables with a smaller number or ranges of possible values before matching is performed.

A weight is additionally assigned to users in each match based on a number of adopters and a number of non-adopters in the match (operation 706). For example, a match containing four adopters and eight non-adopters may result in a weight of 1 for each of the four adopters and a weight of 0.5 for each of the eight non-adopters.

One or more weighted linear models are then produced from the matches and a full set of covariates in the first and third sets of data (operation 708). For example, the weighted linear models may include an endogenous switching model that allows for interactions between the treatment variable (e.g., adopter vs. non-adopter) and the covariates. The full set of covariates may include a significantly larger number of variables than the limited subset of covariates used in exact matching. For example, the full set of covariates may include continuous variables and/or variables collected during the evaluation period for the quasi-experimental design.

Finally, the weighted linear model(s) are used to estimate an ATE between the new version and an older version of the mobile application (operation 710). For example, estimated responses from an endogenous switching model, observed outcomes from the first and third sets of data, and weights from the matching model may be used to produce an estimate of the ATE.

Figure 8:
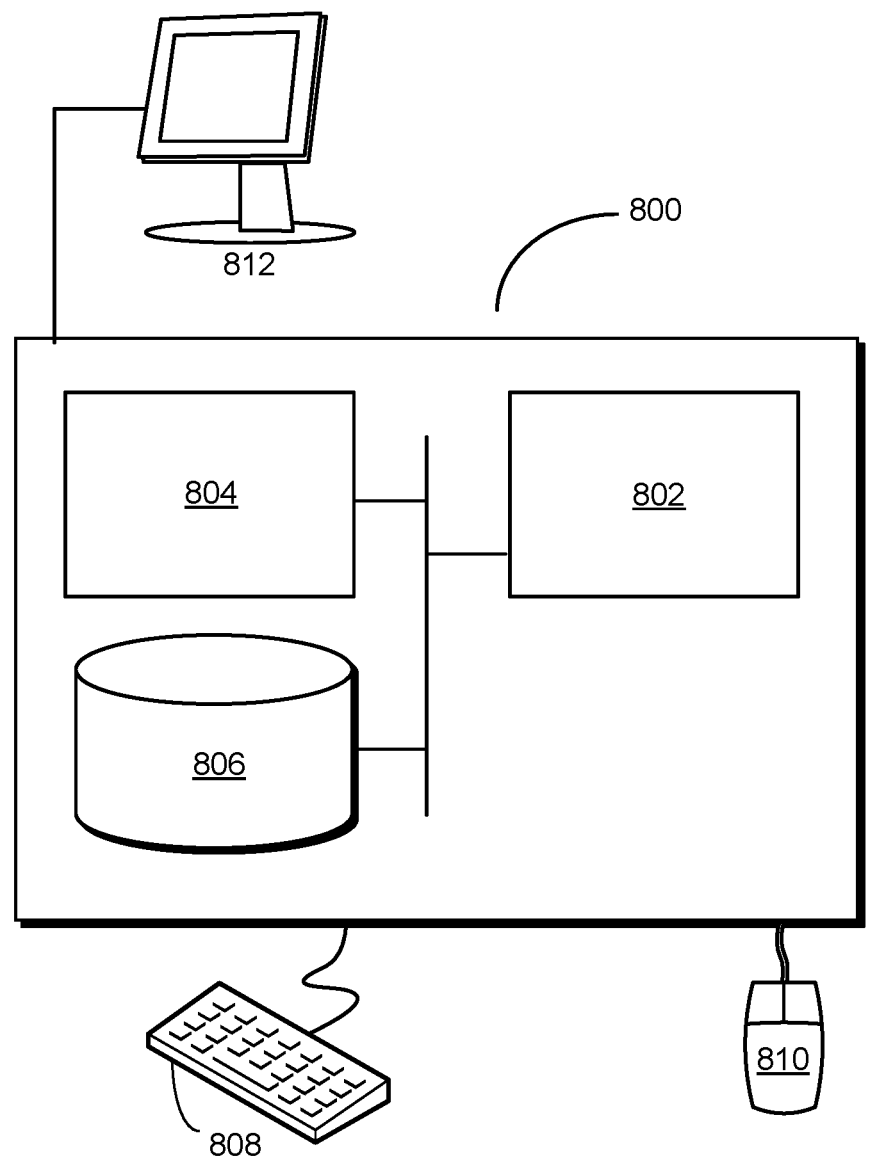
FIG. 8 shows a computer system in accordance with the disclosed embodiments.

FIG. 8 shows a computer system in accordance with the disclosed embodiments. Computer system 800 may correspond to an apparatus that includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for evaluating a performance of a mobile application. The system may include a validation apparatus and an estimation apparatus. The validation and/or estimation apparatus may obtain, for a statistical model used in a quasi-experimental design, a first predicted outcome produced from a first set of data that is collected from two substantially identical versions of a mobile application. Next, the apparatus may use the first predicted outcome to assess a bias of the statistical model. The apparatus may then improve an accuracy of the statistical model by using the assessed bias to normalize a second predicted outcome of the statistical model.

The validation and/or estimation apparatus may also, or alternatively, obtain a first set of data associated with adopters of a new version of a mobile application in a partial rollout of the new version and a second set of data associated with non-adopters of the new version in the partial rollout. Next, the apparatus may apply a statistical model to the first and second sets of data to select a subset of the non-adopters as potential adopters of the new version. The apparatus may then reduce a bias in a quasi-experimental design associated with the mobile application by using the first set of data and a third set of data associated with the potential adopters to estimate an ATE between the new version and an older version of the mobile application.

In addition, one or more components of computer system 800 may be remotely located and connected to the other components over a network. Portions of the present embodiments (e.g., validation apparatus, filtering apparatus, estimation apparatus, data repository, mobile application, electronic devices, etc.) may also be located on different nodes of a distributed system that implements the embodiments. For example, the present embodiments may be implemented using a cloud computing system that performs model validation, bias removal, and/or evaluation of network effect in a quasi-experimental test of a remote mobile application.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining, during a partial rollout of a new version of a mobile application, a first set of data associated with a set of adopters of the new version and a second set of data associated with a set of non-adopters of the new version, wherein the partial rollout of the new version of the mobile application releases the new version to a random set of users;
    applying, by a computer system, a statistical model to the first and second sets of data to select a set of potential adopters of the new version among the set of non-adopters, wherein the set of potential adopters represents users who are inclined to adopt the new version but are currently non-adopters,
        wherein the statistical model includes a matching model, and wherein applying the statistical model to select the set of potential adopters includes:
            comparing the first set of data to the second set of data using the matching model to generate a set of matches among the set of adopters and a subset of the set of non-adopters; and
            selecting the subset of the set of non-adopters as the set of potential adopters; and
    reducing a bias in a quasi-experimental design associated with the mobile application by using the first set of data associated with the set of adopters and a third set of data associated with the set of potential adopters to estimate an average treatment effect (ATE) between the new version and an older version of the mobile application.

2. The method of claim 1, wherein applying the matching model to the first and second sets of data to generate the set of matches comprises:
    using a subset of covariates in the first and second sets of data to perform exact matching of a subset of the set of adopters to the subset of the set of non-adopters.

3. The method of claim 2, wherein applying the matching model to the first and second sets of data to match the set of adopters to the subset of the set of non-adopters further comprises:
    selecting a number of covariates used in the matching model based on a number of adopters of the new version.

4. The method of claim 2, wherein the subset of covariates comprises a bucketized variable.

5. The method of claim 1, wherein applying the matching model to the first and second sets of data to match the set of adopters to the subset of the set of non-adopters comprises:
    for each match in the set of matches, assigning a weight to users in the match based on a number of the set of adopters and a number of the set of nonadopters in the match.

6. The method of claim 1, wherein using the first and third sets of data to estimate the ATE between the new version and the older version of the application comprises:
    producing one or more weighted linear models from the set of matches and a full set of covariates in the first and third sets of data; and using the one or more weighted linear models to estimate the ATE.

7. The method of claim 6, wherein the one or more weighted linear models comprise an endogenous switching model.

8. The method of claim 1, further comprising:
    using the estimated ATE to evaluate a novelty effect associated with adoption of the new version.

9. The method of claim 8, wherein using the estimated ATE to evaluate the novelty effect associated with adoption of the new version comprises:
    estimating the ATE from matched cohorts of the set of adopters and the set of non-adopters over an evaluation period of the quasi-experimental design.

10. The method of claim 1, further comprising:
    using historic data collected from substantially identical versions of the mobile application to validate the statistical model.

11. An apparatus, comprising:
    one or more processors; and
    memory storing instructions that, when executed by the one or more processors, cause the apparatus to:
        obtain, during a partial rollout of a new version of a mobile application, a first set of data associated with a set of adopters of the new version and a second set of data associated with a set of non-adopters of the new version, wherein the partial rollout of the new version of the mobile application releases the new version to a random set of users;
        apply a statistical model to the first and second sets of data to select a set of potential adopters of the new version among the set of non-adopters, wherein the set of potential adopters represents users who are inclined to adopt the new version but are currently non-adopters,
            wherein the statistical model includes a matching model, and wherein applying the statistical model to select the set of potential adopters includes:
                comparing the first set of data to the second set of data using the matching model to generate a set of matches among the set of adopters and a subset of the set of non-adopters; and
                selecting the subset of the set of non-adopters as the set of potential adopters; and
        reduce a bias in a quasi-experimental design associated with the mobile application by using the first set of data associated with the set of adopters and a third set of data associated with the set of potential adopters to estimate an average treatment effect (ATE) between the new version and an older version of the mobile application.

12. The apparatus of claim 11, wherein applying the matching model to the first and second sets of data to generate the set of matches comprises:
    using a subset of covariates in the first and second sets of data to perform exact matching of a subset of the set of adopters to the subset of the set of non-adopters.

13. The apparatus of claim 12, wherein applying the matching model to the first and second sets of data to match the set of adopters to the subset of the set of non-adopters further comprises:
  selecting a number of covariates used in the matching model based on a number of adopters of the new version.

14. The apparatus of claim 11, wherein applying the matching model to the first and second sets of data to match the set of adopters to the subset of the set of non-adopters comprises:
  for each match in the set of matches, assigning a weight to users in the match based on a number of the set of adopters and a number of the set of nonadopters in the match.

15. The apparatus of claim 11, wherein using the first and third sets of data to estimate the ATE between the new version and the older version of the application comprises:
  producing one or more weighted linear models from the set of matches and a full set of covariates in the first and third sets of data; and using the one or more weighted linear models to estimate the ATE.

16. The apparatus of claim 11, wherein the memory further stores instructions that, when executed by the one or more processors, cause the apparatus to:
  use the estimated ATE to evaluate a novelty effect associated with adoption of the new version.

17. A system, comprising:
  a validation apparatus comprising a non-transitory computer-readable medium comprising instructions that, when executed, cause the system to:
    obtain, during a partial rollout of a new version of a mobile application, a first set of data associated with a set of adopters of the new version and a second set of data associated with a set of non-adopters of the new version, wherein the partial rollout of the new version of the mobile application releases the new version to a random set of users;
    apply a statistical model to the first and second sets of data to select a set of potential adopters of the new version among the set of non-adopters, wherein the set of potential adopters represents users who are inclined to adopt the new version but are currently non-adopters,
      wherein the statistical model includes a matching model, and wherein applying the statistical model to select the set of potential adopters includes:
        comparing the first set of data to the second set of data using the matching model to generate a set of matches among the set of adopters and a subset of the set of non-adopters; and
        selecting the subset of the set of non-adopters as the set of potential adopters; and
    reduce a bias in a quasi-experimental design associated with the mobile application by using the first set of data associated with the set of adopters and a third set of data associated with the set of potential adopters to estimate an average treatment effect (ATE) between the new version and an older version of the mobile application.

18. The system of claim 17, wherein applying the matching model to the first and second sets of data to generate the set of matches comprises:
  using a subset of covariates in the first and second sets of data to perform exact matching of a subset of the set of adopters to the subset of the set of non-adopters.

* * * * *